(12) United States Patent
Granato et al.

(10) Patent No.: US 10,355,591 B2
(45) Date of Patent: *Jul. 16, 2019

(54) MULTILEVEL BOOST DC TO DC CONVERTER CIRCUIT

(71) Applicant: TEXAS INSTRUMENTS INCORPORATED, Dallas, TX (US)

(72) Inventors: Maurizio Granato, Milan (IT); Giovanni Frattini, Travaco' Siccomario (IT); Pietro Giannelli, Antella (IT); Michael Lueders, Munich (DE); Christian Rott, Garching (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/658,667

(22) Filed: Jul. 25, 2017

(65) Prior Publication Data
US 2017/0331376 A1    Nov. 16, 2017

Related U.S. Application Data

(63) Continuation of application No. 14/840,183, filed on Aug. 31, 2015, now Pat. No. 9,748,841.
(Continued)

(51) Int. Cl.
*H02M 3/158*     (2006.01)
*G05F 1/565*     (2006.01)
(Continued)

(52) U.S. Cl.
CPC ............. *H02M 3/158* (2013.01); *G05F 1/565* (2013.01); *G05F 1/573* (2013.01); *G05F 1/595* (2013.01);
(Continued)

(58) Field of Classification Search
CPC ........ H02M 3/142; G05F 1/565; G05F 1/573; G05F 1/595
(Continued)

(56) References Cited

U.S. PATENT DOCUMENTS 8,248,152 B2 *  8/2012  Dennard ................. H02M 3/07
                                              327/536
8,649,187 B2 *  2/2014  Aiello .................... H02M 7/483
                                              363/131
(Continued)

OTHER PUBLICATIONS

Capel et al., "A Versatile Zero Ripple Topology", PESC '88 Record (Apr. 1988), IEEE, pp. 133-141.
(Continued)

*Primary Examiner* — Gary A Nash
(74) *Attorney, Agent, or Firm* — Ebby Abraham; Charles A. Brill; Frank D. Cimino (57) ABSTRACT

Described examples include DC to DC converters and systems with switching circuitry formed by four series-connected switches, inductors connected between the ends of the switching circuitry and corresponding output nodes, and with a flying capacitor coupled across interior switches of the switching circuitry and a second capacitor coupled across the ends of the switching circuitry. A control circuit operates the switching circuit to control a voltage signal across the output nodes using a first clock signal and a phase shifted second clock signal to reduce output ripple current and enhance converter efficiency using valley current control. The output inductors are wound on a common core in certain examples.

15 Claims, 10 Drawing Sheets

Related U.S. Application Data (60) Provisional application No. 62/157,149, filed on May 5, 2015.

(51) Int. Cl.
| | |
|---|---|
| G05F 1/595 | (2006.01) |
| H02M 3/335 | (2006.01) |
| H02M 3/142 | (2006.01) |
| G05F 1/573 | (2006.01) |
| H02M 1/00 | (2006.01) |

(52) U.S. Cl.
CPC ........ *H02M 3/142* (2013.01); *H02M 3/33569* (2013.01); *H02M 2001/0003* (2013.01)

(58) Field of Classification Search
USPC ....... 323/242, 243, 246, 270, 274–277, 284, 323/285, 288
See application file for complete search history.

(56) References Cited

U.S. PATENT DOCUMENTS

| | | |
|---|---|---|
| 8,749,995 B2 | 6/2014 | Frattini et al. |
| 9,030,844 B2 | 5/2015 | Strzalkowski |
| 2006/0012348 A1 | 1/2006 | Zhao et al. |
| 2011/0013425 A1 | 1/2011 | Frattini et al. |
| 2012/0250382 A1 | 10/2012 | Frattini et al. |
| 2013/0235626 A1* | 9/2013 | Jang .................... H02M 1/4216 363/37 |
| 2013/0343103 A1* | 12/2013 | Takizawa ............. H02H 7/1203 363/53 |
| 2014/0098587 A1* | 4/2014 | Yatsu .................... H02M 7/483 363/131 |
| 2015/0115926 A1 | 4/2015 | Song et al. |

OTHER PUBLICATIONS

Falin, "Designing DC/DC Converters Based on ZETA Topology", High-Performance Analog Products, Analog Applications Journal, Power Management, Texas Instruments Incorporated, www.ti.com/aaj, 2Q 2010, 8 pgs.

Kochcha et al., "Isolated Zeta Converter: Principle of Operation and Design in Continuous Conduction Mode", WSEAS Transactions on Circuits and Systems, ISSN: 1109-2734, Issue 7, vol. 9, Jul. 2010, pp. 483-492.

Kolar et al., "Novel Aspects of an Application of 'Zero'-Ripple Techniques to Basic Converter Topologies", IEEE, 0-7803-283840-5, 1997, pp. 796-803.

Ruan et al., "Fundamental Considerations of Three-Level DC-DC Converters: Topologies, Analyses, and Control", IEEE Transactions on Circuits and Systems—I: Regular Papers, vol. 55, No. 11, Dec. 2008, pp. 3733-3743.

Chaudhary et al., "Designing Non-Inverting Buck-Boost (Zeta) Converters with a Buck P-FET Controller", Texas Instruments Literature No. SNVA608, LM5085, Power Designer, national.com/powerdesigner, 2011, 8 pgs.

\* cited by examiner

FIG. 12

MULTILEVEL BOOST DC TO DC CONVERTER CIRCUIT

The present application claims priority to and the benefit of U.S. Provisional Patent Application Ser. No. 62/157,149, filed May 5, 2015 and entitled HIGH PERFORMANCE BOOST DC/DC ARCHITECTURE, the entirety of which is hereby incorporated by reference.

TECHNICAL FIELD

The present disclosure relates to power conversion and more particularly to multilevel DC to DC boost converter circuits.

BACKGROUND

High efficiency power supplies are highly desirable for battery-operated systems, including mobile phones, tablets, laptops and other mobile user devices. For example, displays for such devices often need very high efficiency along with low output ripple and fast transient response. In addition, many battery-powered devices include circuitry requiring supply voltages in excess of the battery voltage, and hence boost conversion is necessary. Although relatively high efficiencies are possible using standard boost DC to DC converter circuits, these supply circuits suffer from high switched current output noise. Large output capacitors can be used to control output ripple, but this increases product size, cost and weight. In addition, standard boost DC to DC converters may suffer from right half plane zeros, which limits the available converter bandwidth for stable operation.

SUMMARY

In described examples, a multilevel DC to DC converter includes a switching circuit with four switches coupled in series, along with inductors connected between the ends of the switching circuitry and corresponding output nodes. A first capacitor is coupled across interior switches of the switching circuit and a second capacitor is coupled across the ends of the switching circuit. A control circuit operates the switching circuit to control a voltage signal across the output nodes. The output inductors facilitate triangular input and output current with reduced output ripple without requiring large output capacitors. In certain examples, the output inductors are wound on a common core. In certain implementations, the control circuit generates switching control signals for the outer first and fourth switches of the switching circuit according to a first clock signal. The control circuit generates switching control signals for the second and third switches forming an inner switch pair according to a second clock signal that is phase shifted from the first clock signal, for example by about 180° in certain examples. The phase shifting effectively doubles the output current ripple frequency to further reduce the need for large output capacitance to control output ripple. The reduced output ripple in certain examples facilitates reduced output inductor core loss and enhances efficiency. In certain examples, valley current control is implemented by the control circuit at least partially according to a current feedback signal to facilitate circuit stability without undue bandwidth limitations while mitigating or avoiding right half plane zeros.

DETAILED DESCRIPTION

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the terms "couple", "couples", "coupled" or variants thereof are intended to include indirect or direct electrical connection or combinations thereof. For example, if a first device couples to or is coupled with a second device, that connection may be through a direct electrical connection, or through an indirect electrical connection via one or more intervening devices and connections.

Figure 1:
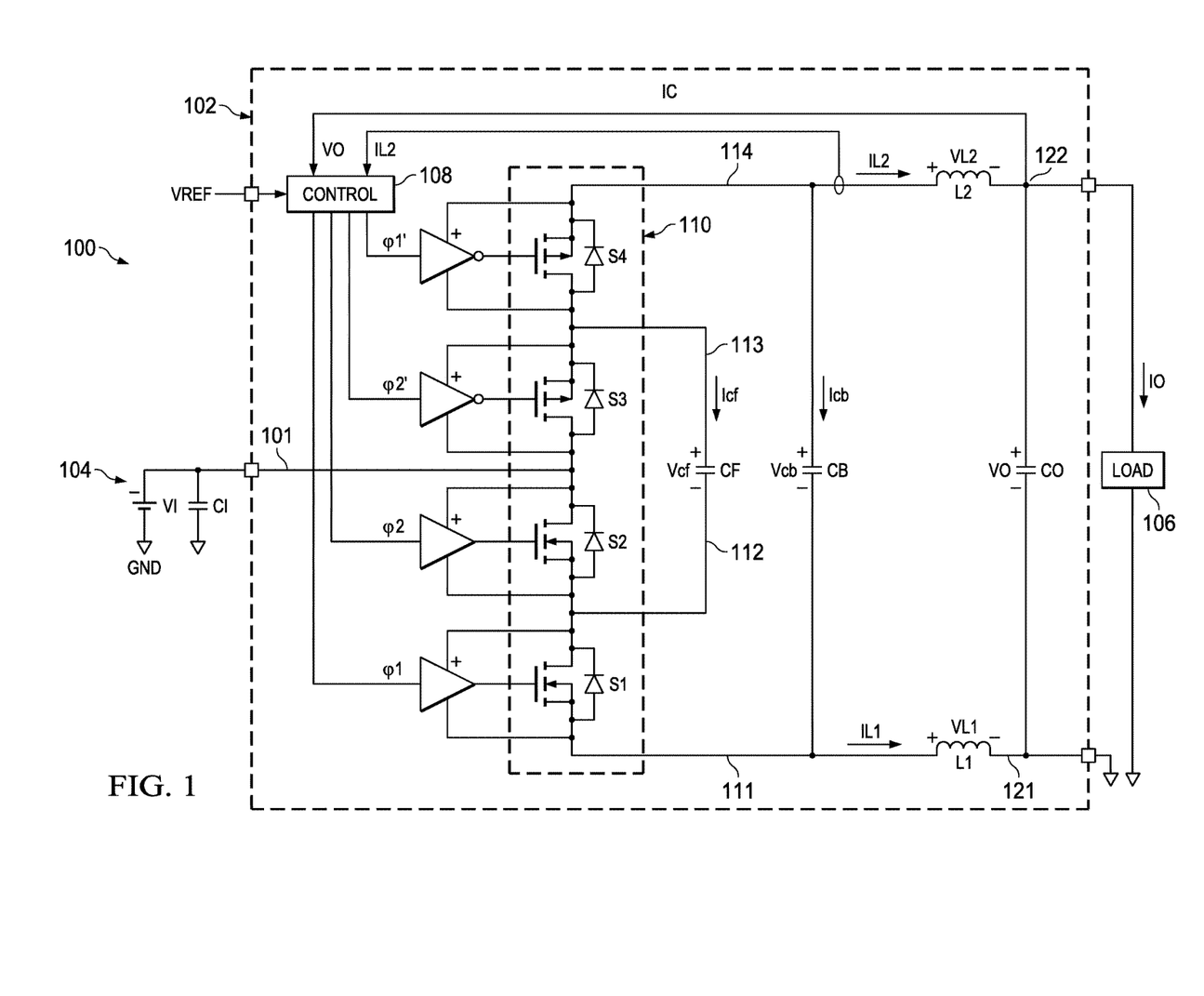
FIG. 1 is a schematic diagram of a DC to DC boost converter integrated circuit.

FIG. 1 illustrates a multilevel boost converter system 100 including a DC to DC converter circuit 102 receiving DC input power from a battery or other suitable power source 104 (VI) and providing DC output power to drive a load 106 at an output voltage VO and an output current IO. In illustrated examples, the output voltage VO is greater than or equal to the input voltage VI, with the converter IC 102 operating in boost mode. The converter circuit 102 in this example is an integrated circuit (IC) that receives input power from the source 104 at an input node or terminal 101. The system 100 includes an input capacitor CI connected across the DC input source 104. The IC 102 in this case also includes a ground terminal connected to the lower terminals of the input source 104 and the input capacitor CI (GND). The converter circuit 102 operates to regulate the output voltage VO according to a reference signal input VREF provided to a control circuit 108 in the IC 102. The reference or setpoint signal VREF can be an internally generated signal or may be provided from an external source as shown in the example of FIG. 1. The load 106 may be any suitable electrical load requiring DC electrical power, such as a display screen for a user device in one example. In certain examples, moreover, the input reference signal VREF and/or the input voltage VI and/or the load 106 changes quickly, requiring fast dynamic response from the converter circuit 102. For example, the circuit 102 may be used to power a portable device display screen load 106 from a battery source 104, and such a load 106 requires an output voltage VO in a range of about 5 V to about 11 V at an output current IO up to about 300 mA. The load power is provided by converting power from a battery voltage source 104 of about 2.9 V to about 4.5 V in one example application.

The converter circuit 102 includes a switching circuit 110 formed by series connection of first, second, third and fourth switches S1, S2, S3 and S4, respectively. The switching circuit 110 provides a series circuit through the switches S1-S4 between a lower first internal node 111 and an upper internal node 114. The switches S1 and S2 are connected together at a second internal node 112 and switches S3 and S4 are connected together at a third internal node 113. In this configuration, the second and third switches S2 and S3 are connected to one another at the input node 101 to receive the input voltage signal VI. The switches S2 and S3 form an internal switch pair connected between the second and third nodes 112 and 113. A first capacitor CF is coupled in parallel across S2 and S3 between the nodes 112 and 113. The first capacitor CF operates in the circuit 102 as a floating or flying capacitor which is charged and discharged by operation of the switching circuit 110 and has a voltage Vcf and current Icf. The switches S2 and S3 and the flying capacitor CF form a nested circuit between the upper and lower (e.g., outer) switches S1 and S4, where the fourth switch S4 is coupled between the third switch S3 and a fourth internal node 114, and the first switch Si is coupled between the second switch S2 and the first internal node 111.

First and second output inductors L1 and L2 couple the switching circuit 110 with first and second output nodes 121 and 122, respectively. In this configuration, the first inductor L1 is coupled between the first internal node 111 and the first output node 121. The second inductor L2 is coupled between the fourth internal load 114 and the second output node 122. A second capacitor CB operates as a bypass capacitor, and CB is connected between the first and fourth nodes 111 and 114. The bypass capacitor CB has a voltage Vcb and a current Icb. In operation of the circuit 102, output current IL1 and IL2 flows from the switching circuit 110 and/or the second capacitor CB to the load 106 through the lower first inductor L1 and the upper or second inductor L2. Return current flows back from the driven load 106 to the source 104 outside the converter IC 102 in one example. The switching operation of the circuit 110, moreover, establishes a voltage Vcf across the flying capacitor CF, as well as a bypass capacitor voltage Vcb across the second capacitor CB.

The converter circuit 102 in the illustrated example also includes an output capacitor CO connected across the output nodes 121 and 122, with the load 106 being connected to the converter circuit 102 via interconnection terminals electrically coupled with the output nodes 121 and 122. In other possible embodiments, the output capacitor CO is external to the integrated circuit 102, and can be connected to the internal output nodes 121 and 122 through the corresponding output interconnection terminals. In certain examples, the feedback capacitor CF and/or the bypass capacitor CB and/or the inductors L1 and L2 can be external to the IC 102.

Although the illustrated example shows an external input capacitor CI connected to the converter IC 102 through corresponding input interconnection terminals, other examples are possible in which an internal input capacitor CI is included within the IC 102. In the illustrated example, moreover, the input source 104 is grounded to an external constant voltage node (e.g., GND) that is connected through a corresponding interconnection terminal with the lower first output node 121. In other examples, the input ground is not connected to the load, and the load current is returned to the source 104 by an external path.

The converter IC 102 also includes a control circuit 108 that operates when powered to generate switching control signals φ1, φ2, φ2' and φ1' to operate selected ones of the switches S1-S4 of the switching circuit 110. As shown in FIG. 1, control signals are provided to the gate control terminals of the switches S1-S4 through drivers connected to the gate, source and drain terminals according to the control signals φ1, φ2, φ2' and φ1' from the circuit 108. In one example, the control circuit 108 provides pulse width modulated (PWM) control signals φ1, φ2, φ2' and φ1' for boost mode operation to control the output voltage signal VO across the first and second output nodes 121 and 122 to be greater than the input signal voltage VI according to a setpoint or reference signal VREF and one or more feedback signals. In the example of FIGS. 1, the control circuit 108 receives a first feedback signal VO representing the output voltage at the nodes 121 and 122, as well as an inductor current or output current signal IL2 representing the current IL2 flowing in the upper output inductor L2. The regulation of the output voltage VO and/or the output current IO by the control circuit 108 can be accomplished using different feedback signals in other examples. For example, current control can be implemented in other examples using a low side current feedback signal representing the inductor current IL1. In one example, the control circuit 108 provides the switching control signals φ1, φ2, φ2' and φ1' to implement current control using compensation ramp signals by either peak current control or valley current control according to the inductor current IL2 while regulating the output voltage VO according to the reference or setpoint signal VREF, as described further below in connection with FIGS. 3 and 4.

In the example of FIG. 1, the upper switches S4 and S3 are P-channel enhancement mode field effect transistors (FETs) such as P-channel metal oxide semiconductor (PMOS) transistors with associated flyback diodes, and the lower switches S1 and S2 are N-channel enhancement mode FETs such as (NMOS) transistors with associated diodes. Other types of switches can be used in other examples. Non-limiting examples include MOS transistors of a single type (e.g., four series-connected PMOS transistors, four series-connected NMOS transistors) or different combinations of NMOS and PMOS transistors, as well as bipolar transistors, IGBTs or the like. The illustrated switches S1-S4 have separately controlled gate terminals to receive voltage signals φ1, φ2, φ2' and φ1' to control the impedance condition between source and drain terminals of the switches (e.g., high impedance or OFF, or low impedance or "ON"). The control circuit 108 includes suitable driver circuitry (not shown) to generate and provide the switching control signals φ1, φ2, φ2' and φ1' to the gate control terminals of the corresponding switches S1-S4 in order to selectively turn individual switches S1-S4 on or off for converting DC input power from the supply 104 to provide DC output power to drive the load 106. In the example of FIG. 1, NMOS first switch S1 electrically connects the first internal node 111 to the second internal node 112 when the signal φ1 is in a first state (HI), and prevents current conduction between the nodes 111 and 112 when the switching control signal φ1 is in a different second state (LO). The second NMOS switch S2 operates in similar fashion to selectively electrically connect the second node 112 to the input node 101 when φ2 is HI, and to prevent conduction between the nodes 112 and 101 when the signal φ2 is LO. In this example, the PMOS third and fourth switches are provided with active high signals φ2' and φ1', respectively. The third switch S3 is turned on to electrically connect the input node 101 to the third internal node 113 when the signal φ2' is HI, and prevents current flow between these nodes 101 and 113 when φ2' is LO. Similarly, the fourth switch S4 electrically connects the node 113 to the node 114 when φ1' is HI, and prevents current conduction between the nodes 113 and 114 when φ1' is LO.

The converter circuit example 102 in FIG. 1 advantageously provides a single chip converter circuit in which the input node 101 and ground terminal can be coupled with an external input source 104 and an input capacitor CI through corresponding input terminals. In addition, the switching circuit 110, the first capacitor CF, the second capacitor CB, the inductors L1 and L2, and the control circuit 108 are formed in a single integrated circuit 102 in this example. In addition, as discussed further below, the output inductors L1 and L2 are connected between the switching circuit 110 and the output nodes 121 and 122 to provide triangular current flow at the load 106. This facilitates control of output ripple current and voltage levels within acceptable specifications without requiring a large output capacitor CO. The output capacitor CO can be included within the integrated circuit chip 102 in certain examples. Moreover, in other examples where an external output capacitor CO is connected outside the IC 102, this external capacitor size CO can be significantly smaller than the output capacitance required for conventional boost converter circuits. The described examples facilitate reduced overall size, weight and cost for the DC to DC conversion system 100 through the reduced output capacitance requirements and improved efficiency as explained further below. In one implementation, the control circuit 108 implements peak current control. Valley control is implemented by the control circuit 108 in other examples.

Figure 2:
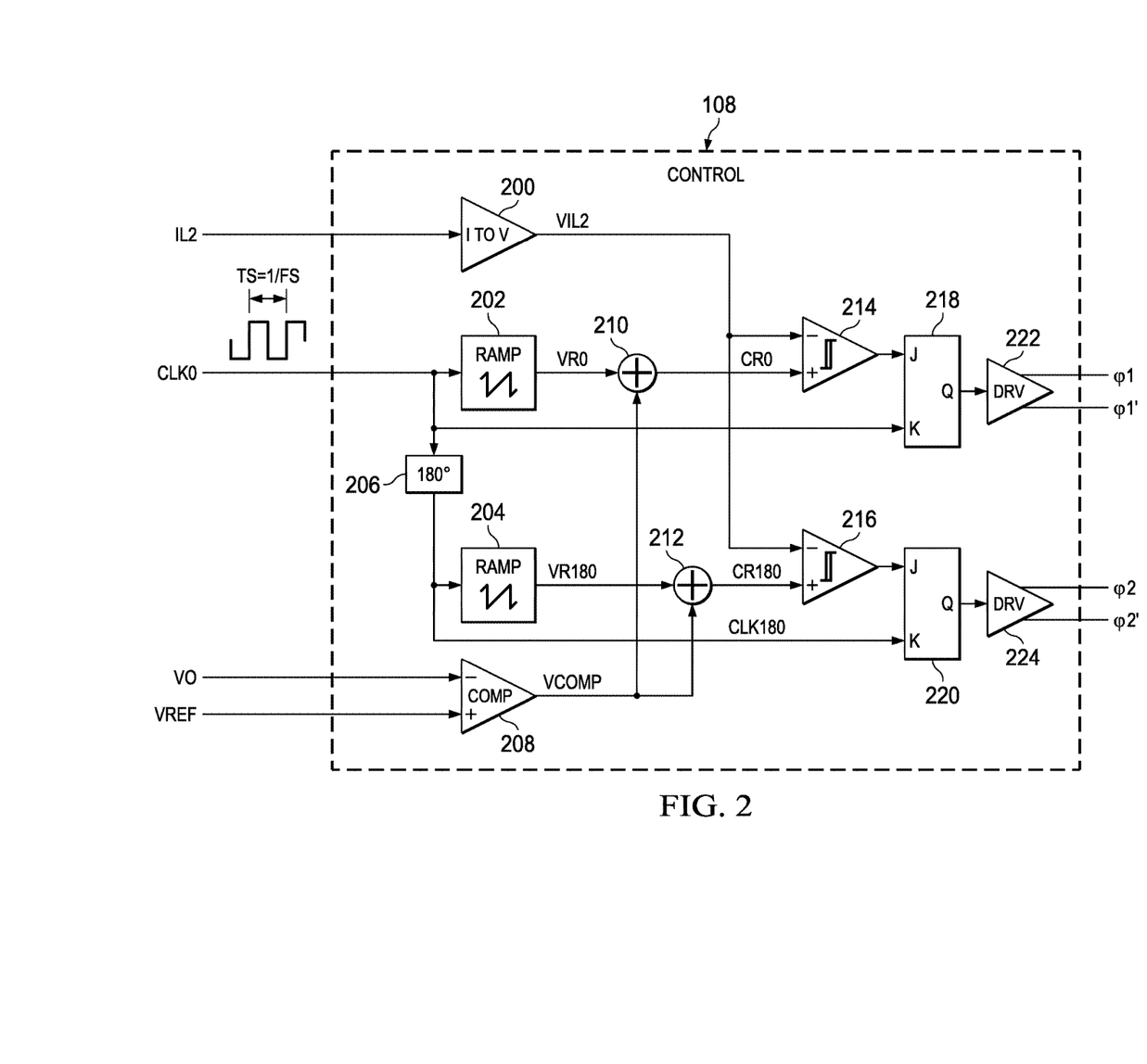
FIG. 2 is a schematic diagram of a control circuit in the boost converter of FIG. 1.

FIG. 2 shows an example control circuit 108 in the converter circuit 102. The control circuit 108 includes a current to voltage (I to V) converter 200 that receives the feedback signal IL2 and provides a corresponding feedback voltage signal VIL2 having a voltage representing the inductor current IL2 flowing through the upper second inductor L2 in FIG. 1. The control circuit 108 receives a clock input signal CLK0 for switching operation of the switching circuit 110. This first clock signal CLK0 has a switching period TS and oscillates at the reciprocal switching frequency FS, such as around 750 kHz in one non-limiting example. The switching control signals φ1, φ2, φ2' and φ1' are generated using ramp circuits 202 and 204 according to the first clock signal CLK0 and a phase shifted second clock signal CLK180 generated by a phase shift circuit 206 according to the first clock signal CLK0. In one example, the phase shift circuit 206 is a CMOS inverter. In this case, the phase shift angle between the CLK0 and CLK180 signals is approximately 180 electrical degrees, but may deviate up to a few degrees due to the switching time of the inverter phase shift circuit 206, and the phase shift value may be different for different switching frequencies FS in some examples. Different phase shifting circuitry 206 can be used in other examples. In certain examples, phase shift amounts different from 180 degrees can be used. The phase shift circuit 206 in the illustrated example generates the second clock signal CLK180 at the same switching frequency FS of the first clock signal CLK0, and the second clock signal CLK180 is phase shifted by approximately 180 degrees from (i.e., relative to) the first clock signal CLK0.

Figure 3:
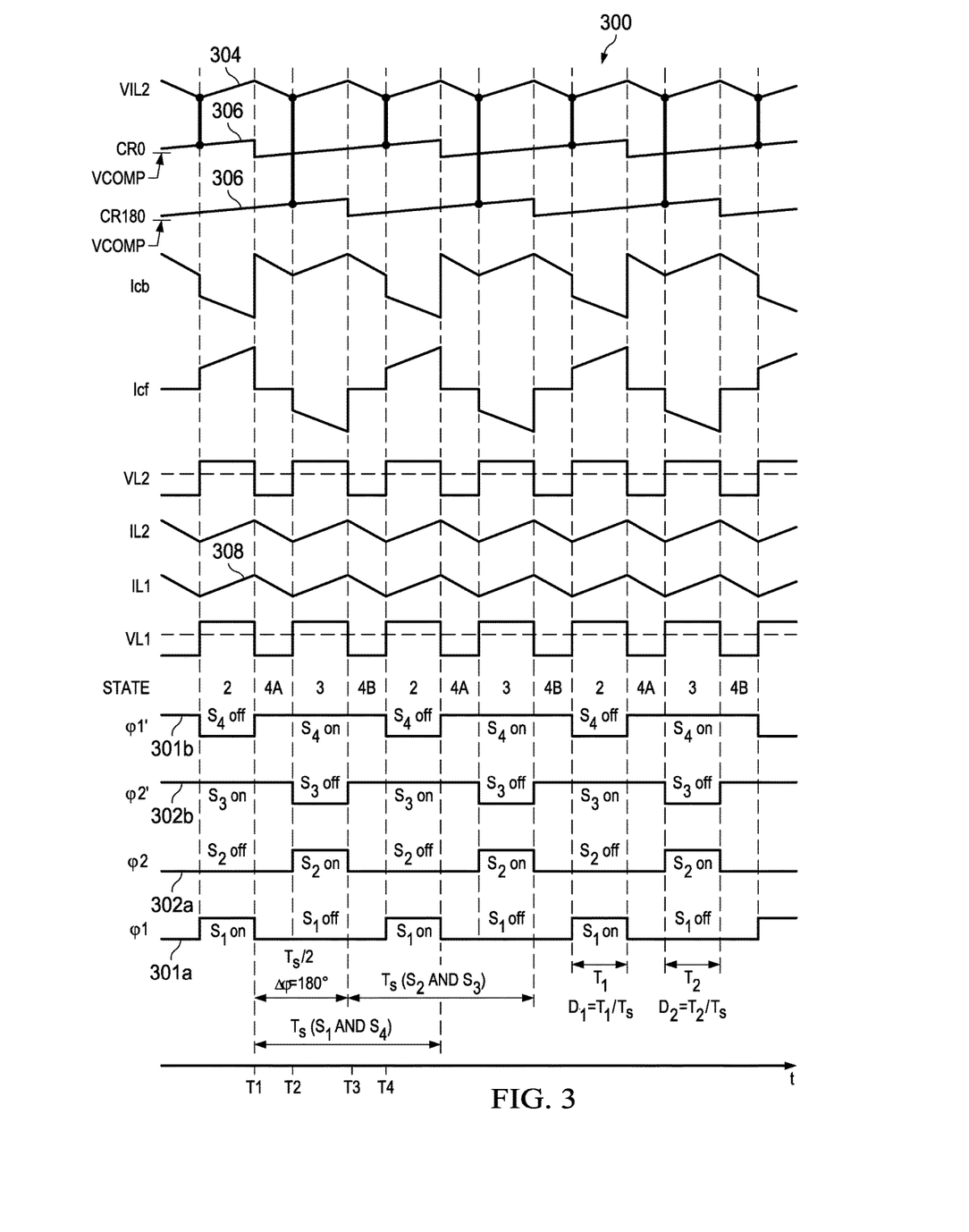
FIG. 3 is a waveform diagram of switching control signals, inductor current and output voltage waveforms in the boost converter of FIG. 1 using valley current control for a duty cycle less than 50%.
Figure 4:
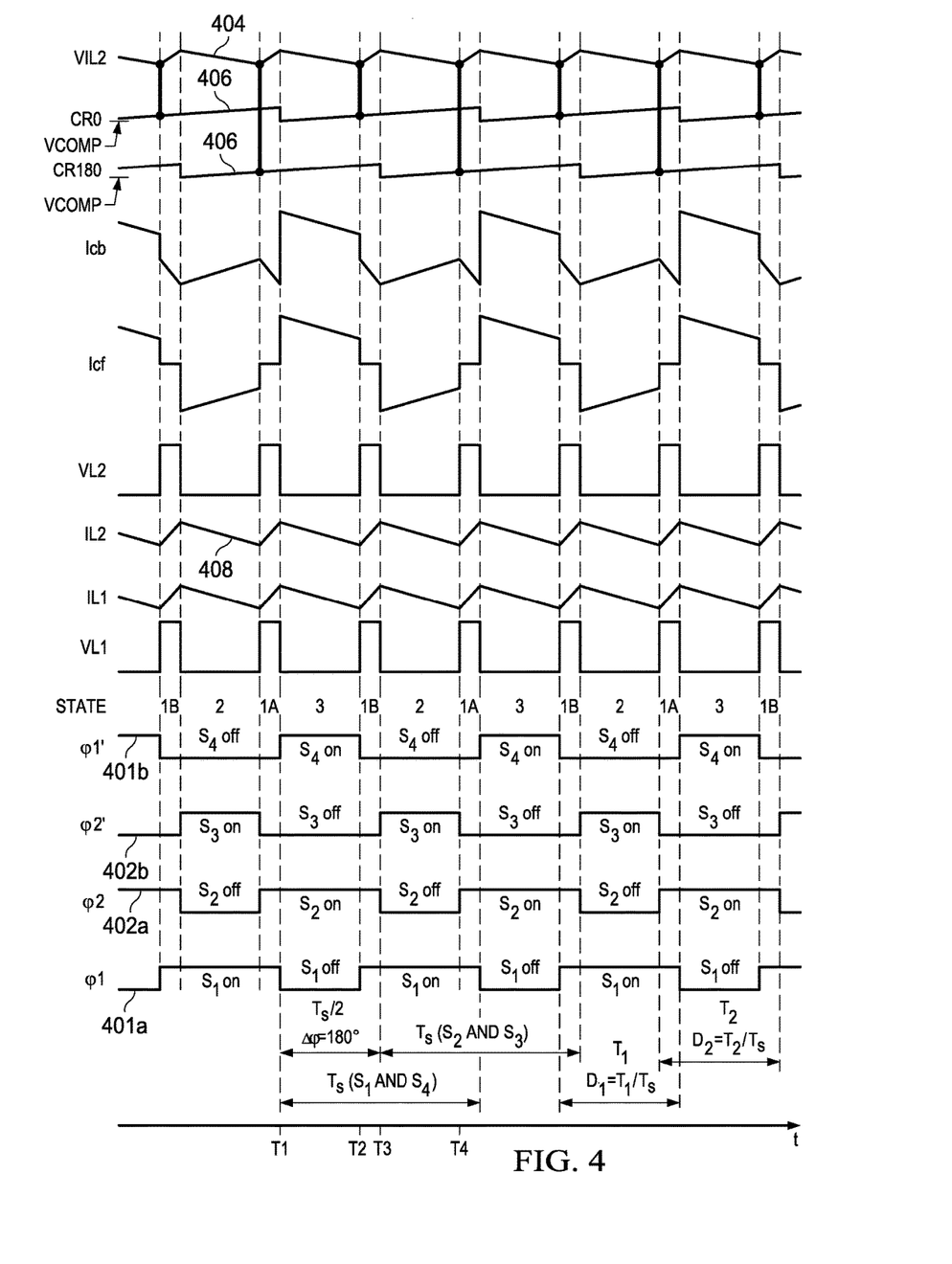
FIG. 4 is a waveform diagram of switching control signals, inductor current and output voltage waveforms in the boost converter of FIG. 1 using valley current control for a duty cycle greater than 50%.

The control circuit 108 in FIG. 2 generates PWM control signals φ1, φ2, φ2' and φ1' to implement closed loop valley current control with output voltage regulation to maintain the output voltage VO in steady state at or near a value greater than or equal to the input signal voltage VI in on example. The circuit 108 generates the switching control signals φ1, φ2, φ2' and φ1' according to the voltage reference VREF and the inductor current signal IL2 or the voltage signal VIL2 provided by the Ito V converter 200. The control circuit 108 in another example implements peak current control. A compensation amplifier 208 in FIG. 2 (e.g., op-amp COMP) compares the output voltage with the reference signal VREF to generate a compensation signal VCOMP representing the output voltage error. The circuit COMP component 208 in Fig, 2 in one example includes an error amplifier and a compensation feedback network (not shown). A first summer circuit 210 adds the compensation voltage signal VCOMP to a first ramp voltage signal VR0 to generate a first compensation ramp voltage signal CR0 representing the sum of the VR0 and VCOMP signals. A first hysteresis comparator circuit 214 compares the CR0 signal from the summer circuit 210 with the inductor current feedback voltage signal VIL2 from the Ito V circuit 200 and provides a pulse signal to a J input of a first flip-flop 218. The first clock signal CLK0 is provided to the K input to the flip-flop 218 to start a clock half cycle, and the Q output of the flip-flop 218 provides an input to a first driver circuit 222 which generates the first and fourth switching control signals φ1 and φ1' to drive the first and fourth (outer) switches S1 and S4, respectively. In the example of FIGS. 1 and 2, the switch S1 is an NMOS transistor and the switch S4 is a PMOS transistor, in which case a single switching control signal φ1, φ1' can be provided to the control gates of the transistors S1 and S4 as shown in the example of FIGS. 3 and 4 below. In other examples were S1 and S4 are both PMOS transistors, or where S1 and S4 are both NMOS transistors, the driver circuit 222 generates complementary first and fourth switching control signals φ1 and φ1'.

Referring also to FIGS. 3 and 4, FIG. 3 shows a waveform diagram 300 of switching control signals, inductor current and output voltage waveforms in the converter circuit 102 using valley current mode control for an overall duty cycle D less than 50%. The waveform diagram 400 in FIG. 4 shows switching control signals, inductor current and output voltage waveforms using valley current mode control for a duty cycle D greater than 50%. D1 is the on-time of switch S1 and D2 is the on-time of switch S2. This sets the voltage conversion ratio VO/VI=1/(1−D). The control circuit 108 implements valley current control in the examples shown in FIGS. 3 and 4. The control circuit 108 generates the first and fourth switching control signals φ1 and φ1' based on the first clock signal CLK0 oscillating at the switching frequency FS using the circuitry 108 of FIG. 2. In addition, the control circuit 108 generates the second and third switching control signals φ2 and φ2' based on the phase shifted second clock signal CLK180. As seen in FIGS. 3 and 4, the control circuit 108 generates the switching control signals φ1, φ2, φ2' and φ1' to implement valley control in each of a plurality of cycles of the clock signals CLK0 and CLK180. In this example, the switching of the inner pair of switches S2 and S3 is offset in time from the switching of the outer switches Si and S4. This staggered or interleaved switching effectively doubles the output current ripple frequency because the current is switched four times in each switching period TS. This helps output ripple filtering without requiring large output capacitance CO. The enhanced ripple reduction also helps reduce core loss inefficiencies in the output inductors L1 and L2 (FIG. 1), and helps improve the system efficiency. Also, the valley current control example of FIGS. 2-4 facilitates stable converter operation without right hand plane zeros, and without undue bandwidth limitations found in conventional boost converters.

The control circuit examples 108 of FIGS. 2-4 provide signals to operate both S1 and S4 together and also to operate S2 and S3 together. In other examples, the control circuit 108 operates a single one of S1 and S4 in a given cycle portion and operates a selected single one of S2 and S3 in the other cycle portion. The control circuit 108 in certain examples sets a selected one of the φ1 or φ1' to a first state to set the corresponding switch to a conductive condition according to CLK0 and then sets the selected signal φ1 or φ1' to a second state to render the switch high impedance or non-conductive when the inductor current signal IL2, VIL2 crosses the first compensation ramp signal CR0 generated according to the first clock signal CLK0. The control circuit 108 switches S1 and S4, or at least one of them, only in a first half cycle of the clock period TS as seen in FIGS. 3 and 4. The circuit 108 generates the pulse width modulated signals φ1 and φ1' with a pulse width D1 that is less than 50% in FIGS. 3 and D1 is greater than 50% in the example of FIG. 4. The duty cycles or duty ratios D will be affected by current loading conditions, the desired reference setpoint VREF and other closed loop operating conditions at any given time. In certain implementations, the reference signal VREF is generally stable, and the circuit 108 adjusts for changes in VI and/or load changes. As seen in FIG. 3, for example, the control circuit 108 compares the decreasing inductor current feedback signal VIL2 with the rising compensation ramp voltage signal CR0 to end the pulse signals φ1 and φ1' when these waveforms cross in one cycle portion. The pulse width of the φ1 and φ1' signals in the example of FIGS. 2-4 is proportional to the error between the desired reference voltage signal VREF and the output voltage feedback signal VO. The closed loop operation by the control circuit 108 drives the output voltage VO to the setpoint reference VREF. Although referred to as 'half cycles', the first and second cycle portions in each clock period TS need not be strictly equal, but are each approximately TS/2 in the illustrated example.

The control circuit 108 in FIG. 2 switches the remaining (inner) switches S2 and S3 in the second cycle portion by generating switching control signals φ2 and φ2' according to the phase shifted second clock signal CLK180. For the second cycle portion TS/2, the control circuit 108 sets a selected one of the second and third switching control signals φ2 or φ2' to the first state (e.g., sets φ2' LO in FIG. 3) according to the signal CLK180 and sets φ2 to the second state (HI) when the inductor current feedback signal VIL2 crosses the second compensation ramp signal CR180. The phase shift circuit 206 provides the second clock signal CLK180 to the second ramp circuit 204. The ramp circuit 204 generates a ramp voltage signal VR180 and provides this to the second summer circuit 212. The summer circuit 212 generates a second compensation ramp signal CR180 based on the sum of the ramp voltage signal VR180 and the compensation error voltage signal VCOMP from the compensation amplifier 208. A second hysteresis comparator 216 compares the inductor current feedback signal VIL2 with the second compensation ramp signal CR180 and generates a pulse signal received at a J input of a second flip-flop 220. The K input of the flip-flop 220 receives the phase shifted second clock signal CLK180, and the flip-flop 220 provides a Q output signal to a second driver 224 to generate the switching control signals φ2 and φ2'. The second driver circuit 224 generates and provides a single switching control signal φ2, φ2' to the gate control terminals of the second and third switches S2 and S3 in the example of FIGS. 3 and 4, for instance, where S2 is an NMOS transistor and S3 is a PMOS transistor as shown in FIG. 1. In other examples where S2 and S3 are both NMOS transistors or where S2 and S3 are both PMOS transistors, the second driver circuit 224 generates complementary second and third switching control signals φ2 and φ2'. As seen in FIGS. 3 and 4, the pulse widths D2 of the signals φ2 and φ2' is determined by the crossing of the VIL2 signal with the CR180 signal in the corresponding cycle portion TS/2.

By the above-described operation, the control circuit 108 implements valley current control in the examples shown in FIGS. 3 and 4. The control circuit 108 generates the first and fourth switching control signals φ1, φ1' based on the first clock signal CLK0 oscillating at the switching frequency FS using the circuitry 108 of FIG. 2. In addition, the control circuit 108 generates the second and third and fourth switching control signals φ2, φ2' based on the phase shifted second clock signal CLK180. As seen in FIGS. 3 and 4, the control circuit 108 generates the switching control signals φ1, φ2, φ2' and φ1' to implement valley control in each of a plurality of cycles of the clock signals CLK0 and CLK180. In this example, the switching of the inner pair of switches S2 and S3 is offset in time from the switching of the outer switches S1 and S4. This staggered or interleaved switching effectively doubles the output current ripple frequency because the current is switched four times in each switching period TS. This facilitates effective output ripple filtering without requiring large output capacitance CO. The enhanced ripple reduction also helps reduce core loss inefficiencies in the output inductors L1 and L2 (FIG. 1), and helps improve the system efficiency. Also, the valley current control example of FIGS. 2-4 facilitates stable converter operation without right hand plane zeros, and without undue bandwidth limitations found with conventional boost converters.

Figure 5:
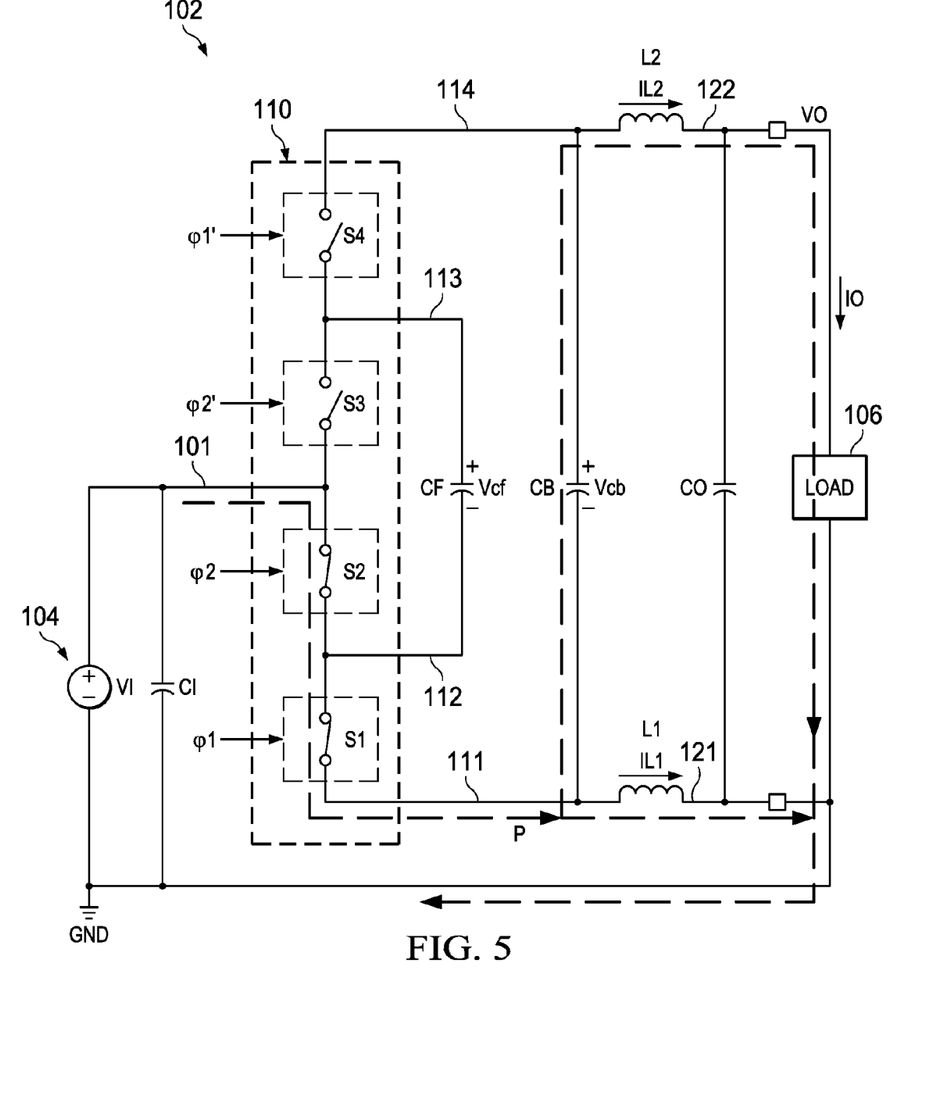
FIG. 5 is a schematic diagram of current flow in a first switching circuit state in the boost converter of FIG. 1.

Referring now to FIGS. 3-8, FIGS. 5-8 show current flow paths P in four switching circuit states of the converter circuit 102. FIG. 5 illustrates the converter circuit 102 in a first state STATE 1, in which switches S1 and S2 are closed or on, while S3 and S4 are open or off.

As seen in FIG. 5, current flows along the path P from the input source 104 through S1 and S2 and through the lower first inductor L1. The path P in this case allows current to flow upward through the bypass capacitor CB into the upper output terminal at node 122, with the bypass capacitor CB discharging. In the state (STATE 1), the flying capacitor CF floats, and the currents IL1 and IL2 increase.

Figure 6:
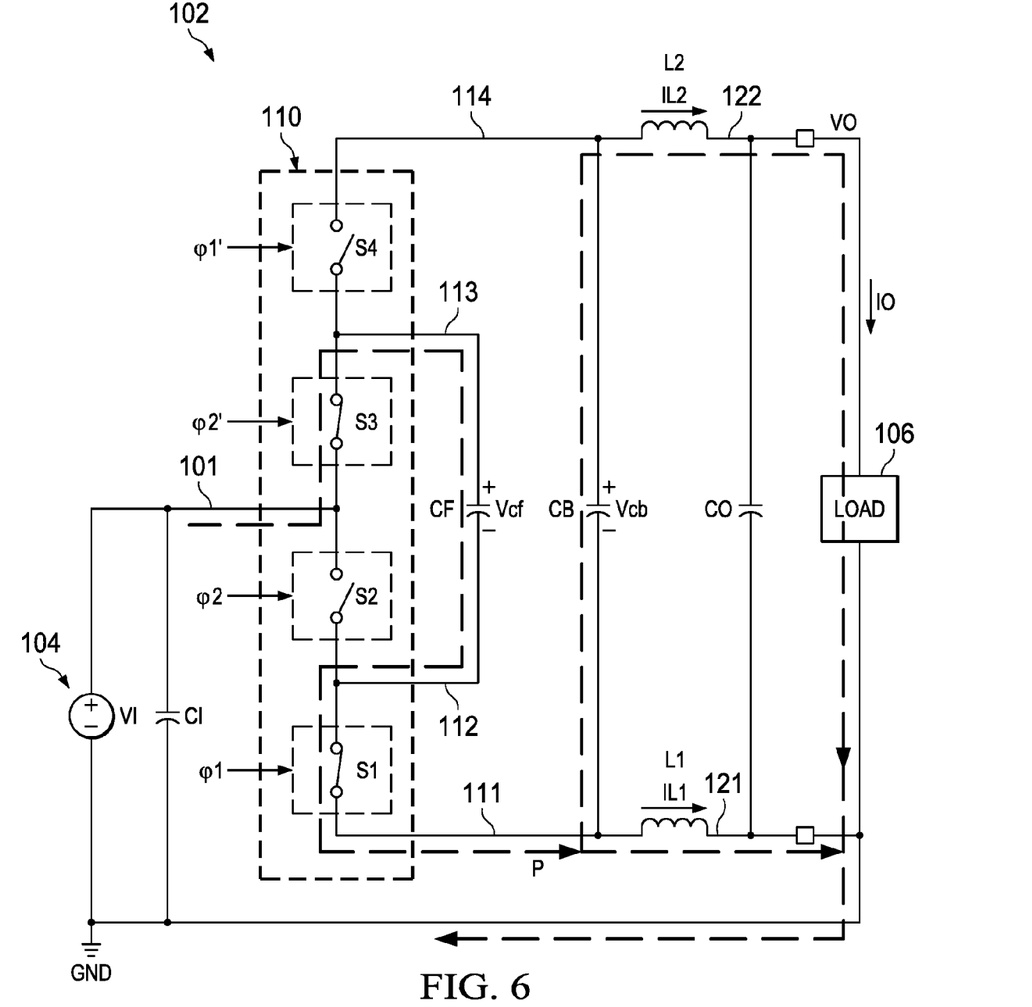
FIG. 6 is a schematic diagram of current flow in a second switching circuit state in the boost converter of FIG. 1.

FIG. 6 shows a second state STATE 2 in which S1 and S3 are closed and S2 and S4 are open. In this condition, the current path P provides for charging the floating capacitor CF by current flow from the input node 101 through S3 to the upper terminal of capacitor CF, and the current flows through the lower terminal of capacitor CF at node 112 through switch Si and the lower inductor L1. The flying capacitor CF is charged in this state. The current path P in FIG. 6 also flows upwards through the bypass capacitor CB through the upper inductor L2. The inductor currents IL1 and IL2 in STATE 2 depend on the duty cycle D.

Figure 7:
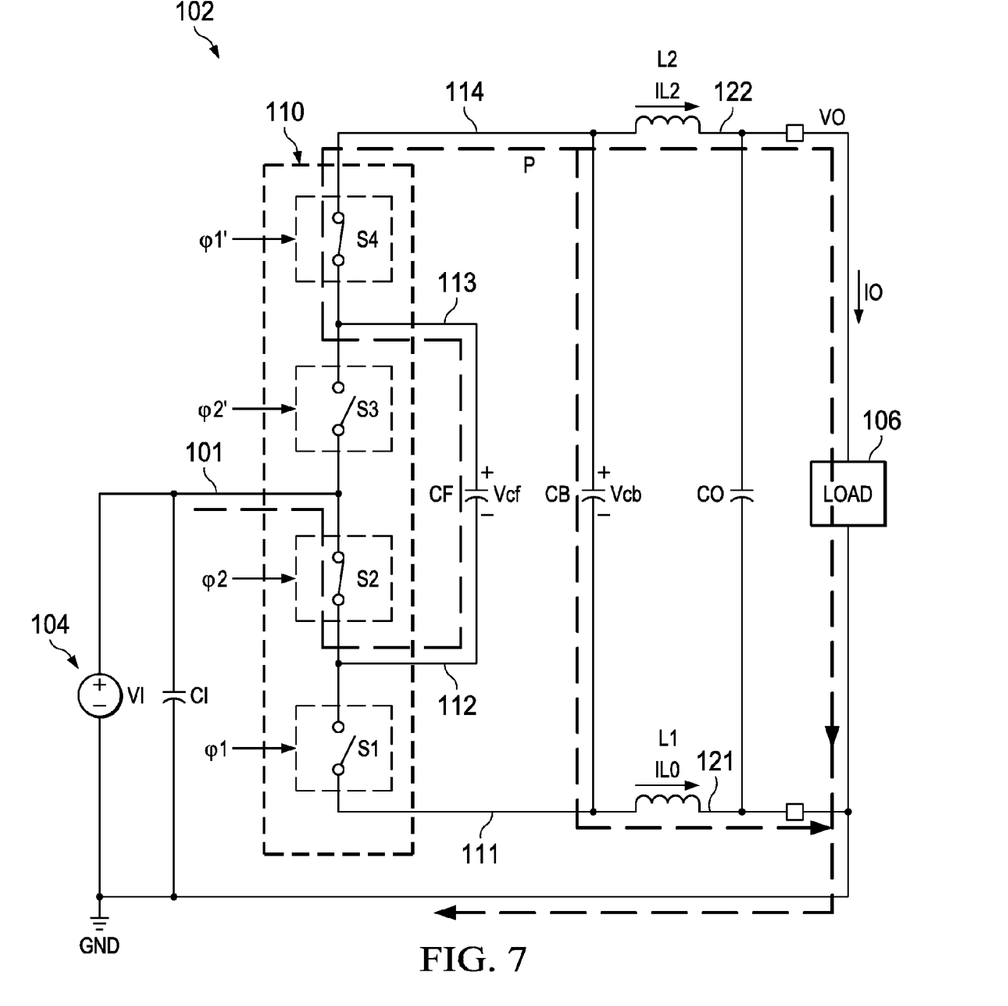
FIG. 7 is a schematic diagram of current flow in a third switching circuit state in the boost converter of FIG. 1.

A third state STATE 3 is shown in FIG. 7 with S2 and S4 closed, and S1 and S3 open. In this state, the floating capacitor CF discharges with current flowing through S2 into the lower terminal of the capacitor CF. The current flow path P in FIG. 7 continues through the closed switch S4 and the upper output inductor L2 to the output node 122 to drive the load 106 via output current IO and/or to charge the bypass capacitor CB. The inductor currents IL1 and IL2 in STATE 3 depend on the duty cycle D.

Figure 8:
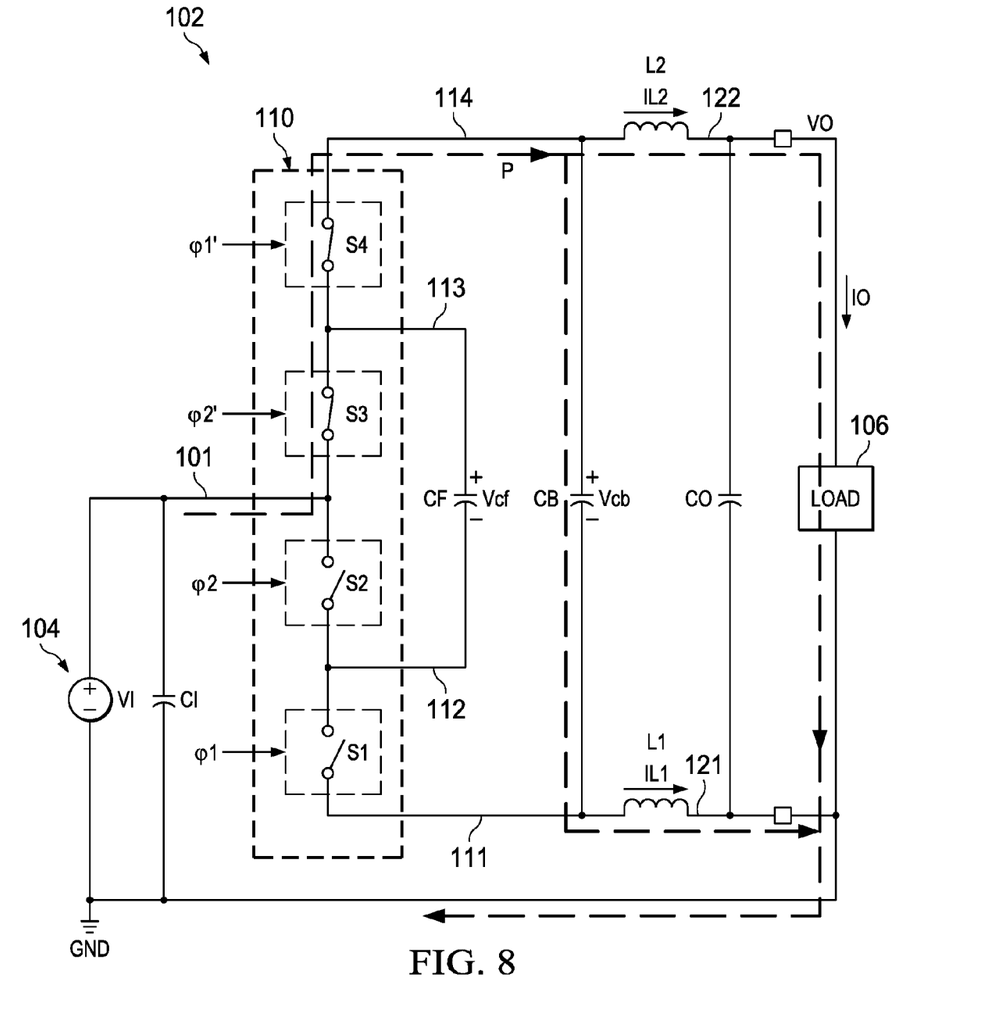
FIG. 8 is a schematic diagram of current flow in a fourth switching circuit state in the boost converter of FIG. 1.

FIG. 8 shows a fourth state STATE 4 in which S1 and S2 are open and S3 and S4 are closed. In this state, the current flows along the path P through S3 and S4 and through the upper output inductor L2. In STATE 4, the current path P also flows downward through the bypass capacitor CB and through the lower inductor L1. In this state, the bypass capacitor CB charges, and the flying capacitor CF floats. In addition, the inductor currents IL1 and IL2 decrease.

The diagram 300 in FIG. 3 shows an example of steady state operation in which the pulse width duty cycles D1 and D2 are less than 50%. In this situation, as well as the situation of FIG. 4 for duty cycles D1 and D2 greater than 50%, the control circuit 108 generates the switching control signals φ1, φ2, φ2', φ1' to control charging and discharging of the first capacitor CF.

The waveform diagram 300 in FIG. 3 shows first and second switching control signals φ1 and φ1' labeled 301a and 301b, respectively, as well as second and third switching control signals φ2 and φ2' labeled 302a and 302b, respectively. In addition, a curve 304 illustrates the inductor current feedback signal VIL2, curves 306 illustrate the CR180 and CR0 compensation ramp voltage signals in the corresponding cycle portions, and a curve 308 shows the upper inductor current IL2. In this valley current control example, the circuit 102 transitions through a sequence of different circuit states in each clock cycle TS: STATE 4 (shown as STATE 4A in FIG. 3); STATE 3; and then returns to STATE 4 (shown as STATE 4B); and then STATE 2 (FIG. 6).

In the initial circuit state STATE 4A (e.g., illustrated in FIG. 8), an example clock cycle begins at time T1 with S4 turning on and S1 turning off while S3 is on and S2 is off. The inductor current feedback signal VIL2 decreases while the second compensation ramp signal CR180 rises from time T1 to T2. This continues until the signals VIL2 and CR180 cross at time T2 in FIG. 3. The bypass capacitor CB charges during the time period T1-T2. In the next state (STATE 3, FIG. 7), the switches S2 and S4 are on, and the inductor current feedback signal VIL2 begins to rise from time T2 while the flying capacitor CF discharges, until the clock signal CLK180 transitions to cause S2 to turn off and S3 to turn on at time T3. This begins STATE 4B (FIG. 8) at T3, in which the inductor current feedback signal VIL2 decreases until T4 when the clock signal CLK0 turns S4 off and turns S1 on. STATE 2 (FIG. 6) begins at T4, and the inductor current IL2 and the corresponding feedback signal VIL2 begin to rise again while the bypass capacitor CB discharges. The example clock cycle ends and a new cycle begins when the next clock cycle again turns S1 off and turns S4 on.

FIG. 4 illustrates waveforms in the diagram 400 for a higher duty cycle condition with D1 and D2 greater than 50%. In this case, the switching control signals φ1 and φ1' are labeled 401a and 401b, respectively, and the second and third switching control signals φ2 and φ2' are labeled 402a and 402b, respectively. Curve 404 in FIG. 4 shows the signal VIL2, curves 406 show the CR180 and CR0 compensation ramp voltage signals in the corresponding cycle portions, and the curve 408 shows the upper inductor current IL2. The converter circuit 102 in this example transitions through a sequence of STATE 3 from T1 through T2 (FIG. 7); STATE 1 (shown as STATE 1B in FIG. 4) from T2 until T3 (FIG. 5); STATE 2 from T3 to T4 (FIG. 6); and again STATE 1 (shown as STATE 4A) from T4 until the end of the current clock cycle and the beginning of the next cycle. In STATE 3 from T1 through T2, the switches S2 and S4 are on, and the inductor current IL2 and the corresponding feedback signal VIL2 decrease while the compensation ramp voltage signal CR180 increases. This leads to charging of CB and discharging of the flying capacitor CF until the VIL2 and CR0 waveforms 404 and 406 cross at T2. At T2, STATE 1 begins with S1 turned on and S4 turned off by the flip-flop 218 and the driver 222 in FIG. 2. The inductor current IL2 and the corresponding feedback signal VIL2 rise until the subsequent pulse edge in the CLK180 signal at T3, which causes S2 to turn off and S3 to turn on. From T3 until T4 (STATE 2), the IL2 and VIL2 signals decrease while the compensation ramp voltage signal CR180 rises, causing the flying capacitor CF to charge until VIL2 and CR180 cross at time T4. This crossing causes S2 to turn on and S3 to turn off, and the inductor current IL2 and the corresponding feedback signal VIL2 increase until the beginning of the next clock cycle based on the first clock signal CLK0.

As seen in FIGS. 3 and 4, the inductor currents have a generally triangular waveform, which mitigates the filtering required to combat output ripple current and ripple voltage. As a result, the output capacitor CO can be smaller than was necessary with conventional boost converter circuits while providing a desired amount of ripple reduction. The architecture of the converter circuit 102 including the output inductors L1 and L2 forms a three-level "Zeta-boost" converter. The pulse width modulated closed loop operation of the control circuit 108 provides output voltage and current regulation to control the output voltage VO to be greater than the input voltage VI. In contrast, conventional boost converter circuits include high and low switches with an inductor connected between the input voltage and the switching circuit. The conventional boost converter circuits require large output capacitance because there is no inductance connected to the output load. Furthermore, conventional boost converters may suffer from right-hand plane zeros which limit the dynamic response in operation (e.g., bandwidth), which is a disadvantage for display drivers and other applications requiring fast transient response. In addition, the described example multilevel DC to DC converter circuits 102 provide improved efficiency compared with other two level Zeta-boost converters and conventional boost converter circuits as illustrated and described below in connection with FIG. 11.

Figure 9:
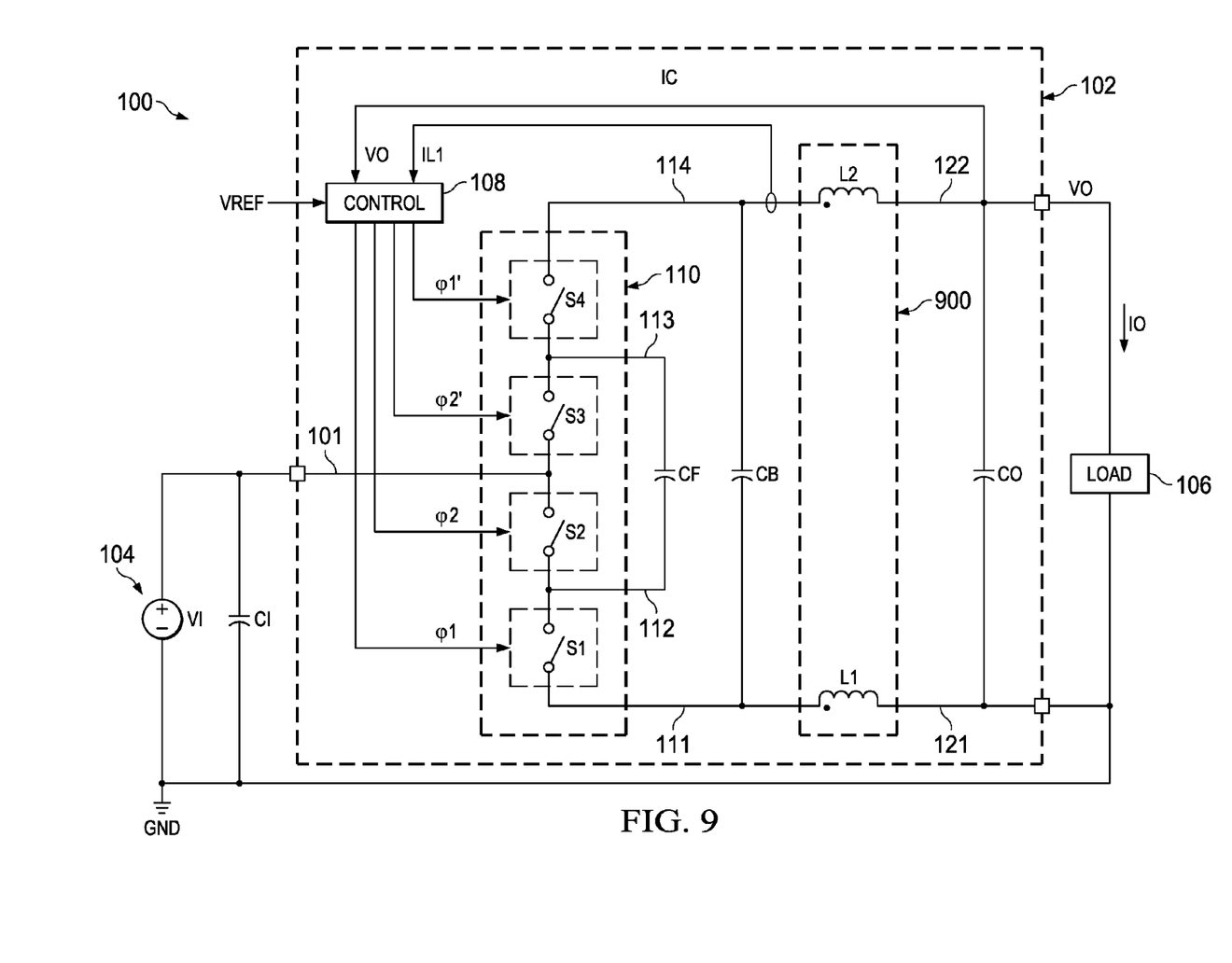
FIG. 9 is a schematic diagram of a DC to DC boost converter integrated circuit with output inductors wound on a common core.
Figure 10:
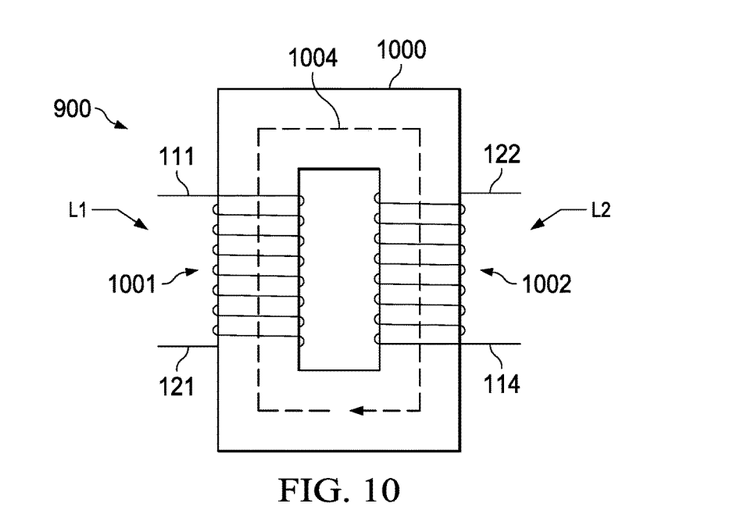
FIG. 10 is a partial side elevation view of the output inductors wound on a common core.

Referring now to FIGS. 9 and 10, FIG. 9 shows another example converter circuit 102 and FIG. 10 illustrates an integrated output inductor structure 900 in which windings 1001 and 1002 of the first and second output inductors L1 and L2 are wound on a single shared or common core 1000. The windings 1001 and 1002 are configured on the core 1000 in one example to implement subtractive flux 1004 for current IL2 flowing through inductor L2 from the switching circuit 110 to the load 106 and/or to the output capacitor CO, and the current IL1 flowing from the load 106 or from the output capacitor CO through the inductor L1 back to the switching circuit 110, indicated by the dots in the schematic diagram of FIG. 9. This coupled inductor structure 900 further facilitates ripple suppression, and can help reduce inductor core loss thereby improving overall efficiency of the converter system 102. In certain end use applications, such as powering user device displays, the improved ripple suppression of the converter circuit 102 improves picture quality and dynamic response while reducing circuit size, cost and weight.

Figure 11:
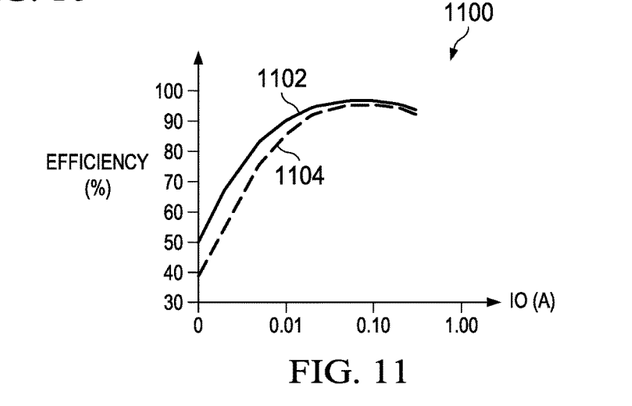
FIG. 11 is a graph of efficiency as a function of output current.
Figure 12:
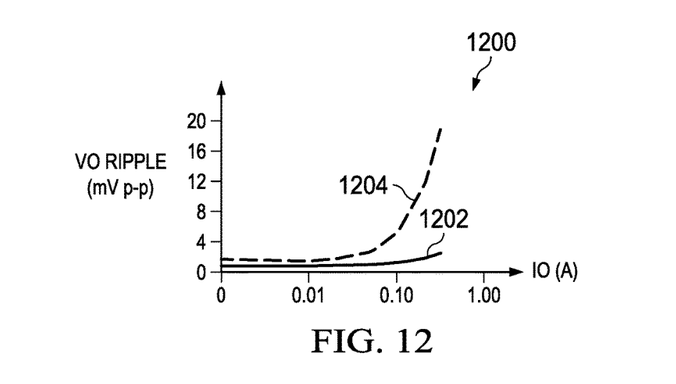
FIG. 12 is a graph of output ripple voltage as a function of output current.

Referring now to FIGS. 11 and 12, FIG. 11 shows a graph 1100 of efficiency as a function of output current, and FIG. 12 shows a graph 1200 of output ripple voltage as a function of output current. In FIG. 11, an efficiency curve 1102 shows efficiency (%) of the DC to DC converter circuit 102 for an input voltage VI of 4.5 V as a function of output current IO up to around 300 mA. Higher currents are possible in other Zeta-boost examples. Curve 1104 in FIG. 11, in contrast, illustrates efficiency of a conventional boost converter over the same current range. As seen in the graph 1100, the disclosed example converter circuits 102 provide improved efficiency compared with conventional boost converters. In FIG. 12, a curve 1202 shows output ripple voltage (peak to peak in millivolts) at the output terminals 121 and 122 in the converter 102 for an input voltage VI of 4.5 V and an output current range of about 0-300 mA. FIG. 12 also shows a ripple voltage curve 1204 corresponding to a conventional boost DC to DC converter over the same output current range. As seen in FIG. 12, the disclosed examples 102 using a three-level Zeta boost converter achieve significantly lower output ripple voltage levels than the conventional boost converter circuits, particularly at higher output load current levels IO.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims. In addition, although a particular feature of the disclosure may have been disclosed with respect to only one of multiple implementations, such feature may be combined with one or more other features of other embodiments as may be desired and advantageous for any given or particular application.

The following is claimed:

1. A DC to DC converter circuit, comprising:
   an input node to receive an input signal;
   a switching circuit, including:
   a first switch coupled between a first internal node and a second internal node,
   a second switch coupled between the second internal node and the input node,
   a third switch coupled between the input node and a third internal node, and
   a fourth switch coupled between the third internal node and a fourth internal node;
   a first capacitor coupled between the second and third internal nodes;
   a second capacitor coupled between the first and fourth internal nodes;
   a first inductor coupled between the first internal node and a first output node;
   a second inductor coupled between the fourth internal node and a second output node; and
   a control circuit adapted to generate switching control signals to operate the switching circuit to control an output voltage signal across the first and second output nodes to be greater than a voltage of the input signal at least partially according to a reference signal and a feedback signal, wherein the feedback signal is representative of a current entering the first inductor from the first internal node.

2. The DC to DC converter circuit of claim 1, wherein the control circuit generates the switching control signals to control charging and discharging of the first capacitor.

3. The DC to DC converter circuit of claim 1, wherein windings of the first inductor and windings of the second inductor are wound on a single shared core.

4. The DC to DC converter circuit of claim 1, wherein the control circuit generates the switching control signals to implement current control at least partially according to an inductor current signal.

5. The DC to DC converter circuit of claim 4, wherein the input node, the switching circuit, the first capacitor, the second capacitor, the first inductor, the second inductor, and the control circuit are formed in a single integrated circuit.

6. The DC to DC converter circuit of claim 1, wherein the control circuit generates the switching control signals to control charging and discharging of the first capacitor.

7. The DC to DC converter circuit of claim 1, wherein:
   the feedback signal is a first feedback signal; and
   the control circuit operates the switching circuit at least partially a second feedback signal, wherein the second feedback signal is representative of a voltage at the first output node.

8. A three-level Zeta boost converter system, comprising:
   a switching circuit, including a first switch, a second switch, a third switch and a fourth switch connected in series, the second and third switches connected to one another at an input node to receive an input signal;
   a first capacitor coupled in parallel across the second and third switches to provide a flying capacitor in the boost converter system;
   a second capacitor coupled in parallel across the switching circuit, the second capacitor including first and second terminals;
   the first switch being connected between the first terminal of the second capacitor and the second switch, wherein the connection between the first switch and the first terminal of the second capacitor is at a first internal node;
   the fourth switch being connected between the second terminal of the second capacitor and the third switch;
   a first inductor coupled between the first terminal of the second capacitor and a first output node;
   a second inductor coupled between the second terminal of the second capacitor and a second output node;
   a third capacitor coupled across the first and second output nodes; and
   a control circuit adapted to operate the switching circuit to control an output voltage signal across the first and second output nodes to be greater than a voltage of the input signal at least partially according to a reference signal and a feedback signal, wherein the feedback signal is representative of a current entering the first inductor from the first internal node.

9. The system of claim 8, wherein windings of the first inductor and windings of the second inductor are wound on a single shared core.

10. The DC to DC converter circuit of claim 8, wherein:
    the feedback signal is a first feedback signal; and
    the control circuit operates the switching circuit at least partially a second feedback signal, wherein the second feedback signal is representative of a voltage at the first output node.

11. A DC to DC converter circuit, comprising:
an input node to receive an input signal;
first, second, third and fourth switches connected in series to form a switching circuit, the second and third switches connected to one another at the input node to receive an input signal;
a first capacitor coupled in parallel across the second and third switches to provide a flying capacitor in the boost converter system;
a second capacitor with a first terminal connected to the first switch, and a second terminal connected to the fourth switch;
the first switch being connected between the second switch and the first terminal of the second capacitor, wherein the connection between the first switch and the first terminal of the second capacitor is at a first internal node;
the fourth switch being connected between the third switch and the second terminal of the second capacitor;
an integrated inductor, including:
a core structure,
a first winding wound at least partially around the core structure to form a first inductor coupled between the first terminal of the second capacitor and a first output node, and
a second winding wound at least partially around the core structure to form a second inductor coupled between the second terminal of the second capacitor and a second output node; and
a control circuit adapted to generate switching control signals to operate the switching circuit to control an output voltage signal across the first and second output nodes to be greater than a voltage of the input signal at least partially according to a reference signal and a feedback signal, wherein the feedback signal is representative of a current entering the first inductor from the first internal node.

12. The DC to DC converter circuit of claim 11, wherein the control circuit is operative to provide switching control signals to the first switch and the fourth switch at least partially according to a first clock signal, wherein the control circuit is operative to provide switching control signals to the second switch and the third switch at least partially according to a second clock signal; the control circuit including a phase shift circuit to generate the second clock signal phase shifted by approximately 180 degrees relative to the first clock signal.

13. The DC to DC converter circuit of claim 11, wherein the control circuit provides the switching control signals to implement valley current control at least partially according to an inductor current signal.

14. The DC to DC converter circuit of claim 11, wherein the control circuit generates the switching control signals to control charging and discharging of the first capacitor.

15. The DC to DC converter circuit of claim 11, wherein:
the feedback signal is a first feedback signal; and
a control circuit to generate switching control signals to operate the switching circuit according to a second feedback signal, wherein the second feedback signal is representative of a voltage at the first output node.

* * * * *